(12) United States Patent
Kim

(10) Patent No.: US 12,361,749 B2
(45) Date of Patent: Jul. 15, 2025

(54) IMAGE CAPTURING SYSTEM AND NETWORK SYSTEM TO SUPPORT PRIVACY MODE

(71) Applicant: HANWHA TECHWIN CO., LTD., Seongnam-si (KR)

(72) Inventor: Gwantae Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 207 days.

(21) Appl. No.: 18/324,959

(22) Filed: May 27, 2023

(65) Prior Publication Data
US 2023/0306780 A1 Sep. 28, 2023

Related U.S. Application Data

(63) Continuation of application No. 16/402,721, filed on May 3, 2019, now abandoned.

(30) Foreign Application Priority Data

May 10, 2018 (KR) .................. 10-2018-0053788
Mar. 19, 2019 (KR) .................. 10-2019-0031219

(51) Int. Cl.
*G06V 40/16* (2022.01)
*G06F 18/22* (2023.01)
(Continued)

(52) U.S. Cl.
CPC .............. *G06V 40/16* (2022.01); *G06F 18/22* (2023.01); *G06V 40/161* (2022.01); *H04N 5/77* (2013.01);
(Continued)

(58) Field of Classification Search
CPC ...... G06V 40/16; G06V 40/161; G06F 18/22; H04N 5/77; H04N 23/611; H04N 23/62;
(Continued)

(56) References Cited

U.S. PATENT DOCUMENTS 8,826,446 B1 9/2014 Liu et al.
2004/0263625 A1* 12/2004 Ishigami .......... G08B 13/19641
348/E7.086
(Continued)

OTHER PUBLICATIONS

H.-M. Moon, C. H. Seo, Y. Chung and S. B. Pan, "Privacy Protection Technology in Video Surveillance System," 2009 Fourth International Conference on Embedded and Multimedia Computing, Jeju, Korea (South), 2009, pp. 1-6, doi: 10.1109/EM-COM.2009.5402973. (Year: 2009).*
(Continued)

*Primary Examiner* — Timothy J Henn
(74) *Attorney, Agent, or Firm* — McLean IP Global; Jason Y. Pahng

(57) ABSTRACT

A video capturing system includes: a storage medium to store a plurality of image information sets corresponding to a plurality of reference images, respectively; and a video processing device to selectively control video capture and at least one other operation associated with video capture according to a privacy level selected from a privacy mode, wherein the video processing device includes a face detector to sense a face image from the captured video, and a privacy level controller to select one of a plurality of privacy levels according to an image information set matched with the face image sensed from the plurality of image information sets.

14 Claims, 12 Drawing Sheets

(51) Int. Cl.
*H04N 5/77* (2006.01)
*H04N 23/611* (2023.01)
*H04N 23/62* (2023.01)
*H04N 23/66* (2023.01)
*H04N 23/661* (2023.01)
*H04N 23/667* (2023.01)
*H04N 23/90* (2023.01)

(52) U.S. Cl.
CPC ........... *H04N 23/611* (2023.01); *H04N 23/62* (2023.01); *H04N 23/66* (2023.01); *H04N 23/661* (2023.01); *H04N 23/667* (2023.01); *H04N 23/90* (2023.01)

(58) Field of Classification Search
CPC .... H04N 23/66; H04N 23/661; H04N 23/667; H04N 23/90
See application file for complete search history.

(56) References Cited

U.S. PATENT DOCUMENTS

| | | | | |
|---|---|---|---|---|
| 2009/0185723 | A1* | 7/2009 | Kurtz | G06V 40/50 382/118 |
| 2010/0205667 | A1* | 8/2010 | Anderson | G06F 3/013 726/19 |
| 2012/0230596 | A1* | 9/2012 | Watanabe | H04N 21/4627 382/232 |
| 2014/0123208 | A1 | 5/2014 | Plagemann et al. | |
| 2015/0138364 | A1* | 5/2015 | Enomoto | H04N 23/661 348/151 |
| 2016/0073049 | A1* | 3/2016 | Li | H04N 1/00307 348/207.1 |
| 2016/0104035 | A1* | 4/2016 | Wang | G06V 20/52 382/118 |
| 2018/0005500 | A1* | 1/2018 | Robertson | G06Q 10/1091 |
| 2018/0103206 | A1* | 4/2018 | Olson | H04N 23/6812 |
| 2018/0165473 | A1* | 6/2018 | Debickes | H04L 63/04 |
| 2018/0278835 | A1* | 9/2018 | Meganathan | H04N 23/611 |

OTHER PUBLICATIONS

L. Teixeira, F. Maffra, K. Lelu, A. Al-Obaidi and A. Badii, "A rule-based methodology and assessment for context-aware privacy," 2014 IEEE 6th International Conference on Awareness Science and Technology (iCAST), Paris, France, 2014, pp. 1-6, doi: 10.1109/ICAwST.2014.6981839. (Year: 2014).*

Jiayu Shu and Rui Zheng and Pan Hui, "Cardea: Context-Aware Visual Privacy Protection from Pervasive Cameras," arXiv: 1610.00889 [cs.CR], 2016, doi: 10.48550/arXiv.1610.00889 (Year: 2016).*

KR Office action for KR patent application 10-2019-0031219 issued on Mar. 7, 2023.

* cited by examiner

FIG. 8

| Reference Image Information Set | Count Value | Privacy Level | User Designation |
|---|---|---|---|
| RFI1 | CNT1 | PL1 | NONE |
| RFI2 | CNT2 | PL3 | NONE |
| ⋮ | ⋮ | ⋮ | ⋮ |
| RFIn | CNTn | PL2 | NONE |

IMAGE CAPTURING SYSTEM AND NETWORK SYSTEM TO SUPPORT PRIVACY MODE

CROSS REFERENCE TO RELATED APPLICATIONS

This application is a continuation of U.S. application Ser. No. 16/402,721 filed on May 3, 2019. In addition, this application claims priority from and the benefit of Korean Patent Application No. 10-2018-0053788, filed on May 10, 2018 and Korean Patent Application No. 10-2019-0031219, filed on Mar. 19, 2019, which are hereby incorporated by reference for all purposes as if fully set forth herein.

BACKGROUND

Field

Exemplary implementations of the invention relate generally to video capturing systems and network systems including the same and, more specifically, to video capturing systems and network systems to support a privacy mode.

Discussion of the Background

Recently, video monitoring systems have rapidly spread for various purposes such as public security and safety. Such video monitoring systems can provide video data to other devices through a network, and thus enable a remote device to playback or store captured videos.

As the use of such video monitoring systems has increased, privacy protection has become a social problem. Since the video monitoring systems support various functions associated with captured videos, a user may intend to stop video capturing functions or to use only parts of the captured video or other functions, if necessary. In this case, the user may set a video monitoring system to activate a privacy mode, and thus disable some functions supported by the video monitoring systems. However, such a method has a disadvantage in that the user needs to manually set the video monitoring system to activate the privacy mode and this may cause individual privacy not to be effectively protected.

The above information disclosed in this Background section is only for understanding of the background of the inventive concepts, and, therefore, it may contain information that does not constitute prior art.

SUMMARY

Video capturing systems and network systems including the same constructed according to the principles and exemplary implementations of the invention are capable of automatically operating in a privacy mode, thereby improving performance of the video capturing system and/or network resources, and convenience. For example, exemplary implementations of the video capturing systems and network systems can determine one of a plurality of privacy levels and operate according to the determined privacy level in the selected privacy mode.

Additional features of the inventive concepts will be set forth in the description which follows, and in part will be apparent from the description, or may be learned by practice of the inventive concepts.

A video capturing system constructed according to one or more embodiments includes: a storage medium to store a plurality of image information sets corresponding to a plurality of reference images, respectively; and a video processing device to selectively control video capture and at least one other operation associated with video capture according to a privacy level selected from a privacy mode, wherein the video processing device includes a face detector to sense a face image from the captured video, and a privacy level controller to select one of a plurality of privacy levels according to an image information set matched with the face image sensed from the plurality of image information sets.

The storage medium may be configured to store the plurality of privacy levels corresponding to the plurality of image information sets, respectively.

The face detector may be operable to acquire face images, to generate the plurality of image information sets in association with the acquired face images, and to generate signals to store the plurality of image information sets in the storage medium.

The video processing device may be operable to set privacy levels corresponding to the plurality of image information sets by determining a privacy level corresponding to each of the image information sets according to the number of face images associated with the corresponding image information set from among the acquired face images, and to generate signals to store the set privacy levels in the storage medium.

The video capturing system may further include an external terminal to receive a user input indicating a privacy level corresponding to a selected image information set from among the plurality of image information sets, and the video processing device may be operable to correct the privacy level stored in association with the selected image information set in response to the user input.

The sensed face image may include a first face image and a second face image, the first and second face images may be matched with first and second image information sets of the plurality of image information sets, respectively, the first and second image information sets may correspond to first and second privacy levels of the plurality of privacy levels, respectively, and the privacy level controller may select the privacy level having a higher priority between the first and second privacy levels, with the priorities of the first and second privacy levels being predetermined.

The video capturing system may further include a communicator to provide communication with an external device,
wherein the video processing device is operable to transmit event information to the external device through the communicator when each of the plurality of image information sets is not matched with the sensed face image.

The video processing device may be operable to operate in the privacy mode when the image information set is matched with the sensed face image from among the plurality of image information sets, and to stop the privacy mode a predetermined time period after starting to operate in the privacy mode.

The video processing device may be operable to control at least a part of the operations when a first privacy level of the plurality of privacy levels is selected, and to control other parts of the operations when a second privacy level of the plurality of privacy levels is selected.

The video capturing device may be operable to stop the capturing of the video when a first privacy level of the plurality of privacy levels is selected.

The video capturing system may further include a communicator to provide communication with an external device, wherein the operations may include transmitting the captured video to the external device through the communicator, and the video capturing device may be operable to stop transmitting the captured video to the external device when a second privacy level of the plurality of privacy levels is selected.

The storage medium may include a nonvolatile storage medium, wherein the operations may include at least one of a first operation of storing the captured video in the nonvolatile storage medium and a second operation of storing the captured video in an external storage medium through the communicator, and the video capturing device may be operable to stop the first and second operations when a third privacy level of the plurality of privacy levels is selected.

The video capturing system may further include a communicator to provide communication with an external device, wherein the video processing device may be operable to transfer the selected privacy level to the external device through the communicator.

A network system constructed according to another embodiment includes a plurality of video capturing devices connected to the network, wherein a first video capturing device of the plurality of video capturing devices includes: a communicator to provide communication through the network; a storage medium to store a plurality of image information sets corresponding to a plurality of reference images, respectively; and a video processing device to selectively control capturing video and at least one other operation associated with the captured video according to a privacy level selected from a privacy mode, wherein the video processing device includes a face detector to sense a face image from the captured video, and a privacy level controller to select one of a plurality of privacy levels according to an image information set matched with the sensed face image from among the plurality of image information sets, and at least one second video capturing device of the plurality of video capturing devices is operable to enter the privacy mode when one of the plurality of privacy levels for the first video capturing device is selected.

The network system may further include a computer device to communicate with the plurality of video capturing devices through the network, wherein the first video capturing device may be operable to transfer the selected privacy level to the computer device through the communicator, and the computer device may be operable to control the second video capturing device to operate in the privacy mode according to the selected privacy level.

The computer device may be operable to transfer the selected privacy level to the second video capturing device, and the second video capturing device may be operable to control the capturing video and at least one operation associated with the captured video according to the selected privacy level in the privacy mode.

The second video capturing device may be operable to selectively control the operations in substantially the same manner as the first video capturing device in the privacy mode.

The face detector may be operable to acquire face images, to generate the plurality of image information sets in association with the acquired face images, and to store the plurality of image information sets in the storage medium.

The video processing device may be operable to set privacy levels corresponding respectively to the plurality of image information sets by determining a privacy level corresponding to each of the image information sets according to the number of face images associated with the corresponding image information set among the acquired face images, and to generate signals to store the set privacy levels in the storage medium.

The video capturing system may further include an external terminal to receive a user input indicating a privacy level corresponding to a selected image information set from among the plurality of image information sets, and wherein the video processing device may be operable to correct the privacy level stored in association with the selected image information set in response to the user input.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 8 is a table showing an exemplary list of information associated with the reference image information sets.

DETAILED DESCRIPTION

Figure 1:
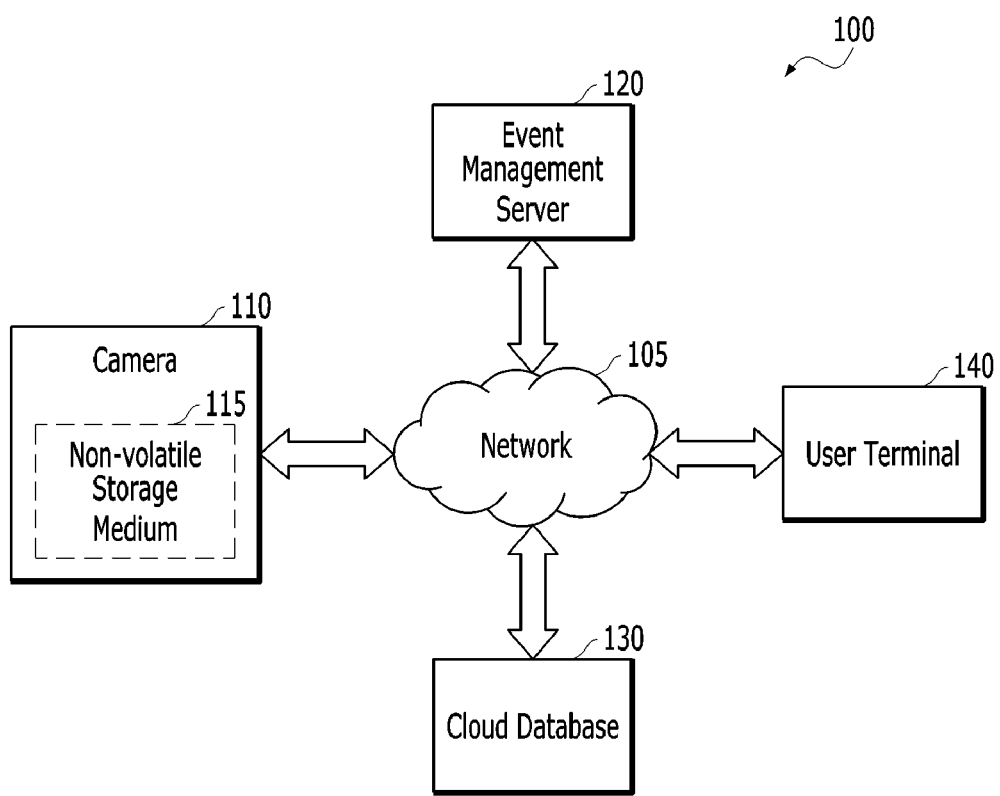
FIG. 1 is a block diagram of an exemplary embodiment of a network system including a camera constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

In the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, a video capturing system, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the video capturing system, and/or one or more components thereof may include or otherwise be associated with one or more memories including code (e.g., instructions) configured to cause one or more processors of the video capturing system, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a block diagram of an exemplary embodiment of a network system including a camera constructed according to the principles of the invention.

Referring to FIG. 1, the network system 100 includes a network 105, a camera 110, an event management server 120, a cloud database 130 and a user terminal 140. Each of the camera 110, the event management server 120, the cloud database 130 and the user terminal 140 may include one or more processors, memories and other suitable components for executing code such as commands stored in a medium which can be read by computer programs or a computer, thereby executing various applications and steps described herein. For example, the computer programs and/or commands may be stored in a computer-readable storage medium inside or outside the corresponding configuration.

The network 105 connects the camera 110, the event management server 120, the cloud database 130 and the user terminal 140. The network 105 may include one or more of a public network, one or more private networks, a wired network, a wireless network, other suitable types of networks and combinations thereof. Each of the camera 110, the event management server 120, the cloud database 130 and the user terminal 140 may include one or more of a wired communication function and a wireless communication function, and thus communicate with one another through the network 105.

The camera 110 communicates with one or more of the event management server 120, the cloud database 130 and the user terminal 140 through the network 105. For example, the camera 110 may include an image sensor for converting light signals inputted through a lens into electrical signals and a microphone for converting voice into electrical signals, and capture a video using the image sensor and the microphone. The function of capturing a video is turned on/off according to various methods, and performed when the camera 110 is in an on-state.

The camera 110 processes the captured video (or other multimedia) according to suitable methods. The camera 110 may store video or other multimedia data (referred to collectively and generally herein as "video") based on the captured video in a nonvolatile storage medium 115 installed therein, upload the video to the cloud database 130, or transmit the video to the user terminal 140 through real-time communication, for example.

The camera 110 may generate event information based on the captured video. For example, a variety of event types may be defined, the event types including motion sensing, voice sensing, face sensing, body sensing, fire sensing, crying sound sensing, gunfire sound sensing, shock sound sensing and the like. When at least one of the event types is sensed from the captured video, the camera 110 may generate event information corresponding to the sensed event type. The camera 110 may include components for sensing such event types. The camera 110 may transmit the generated event information to the event management server 120.

The event management server 120 may process the received event information through various methods, and provide the event information or the processed information when the user terminal 140 accesses the event management server 120.

The cloud database 130 may store the video data provided from the camera 110, and provide the video data to the user terminal 140 in response to a request of the user terminal 140. The camera 110 may provide the video data stored in the nonvolatile storage medium 115 in response to a request of the user terminal 140. When the nonvolatile storage medium 115 can be attached to and detached from the camera 110, the user may connect the nonvolatile storage medium 115 to various devices including the user terminal 140, in order to playback the video data.

The user terminal 140 may include one or more devices of a personal computer (PC), a desktop computer, a laptop computer, a portable computer, a personal digital assistant (PDA), a smart phone, a tablet PC and a video game machine, which can process information and playback the video data by communicating with the camera 110, the event management server 120 and the cloud database 130 through the network 105.

Figure 2:
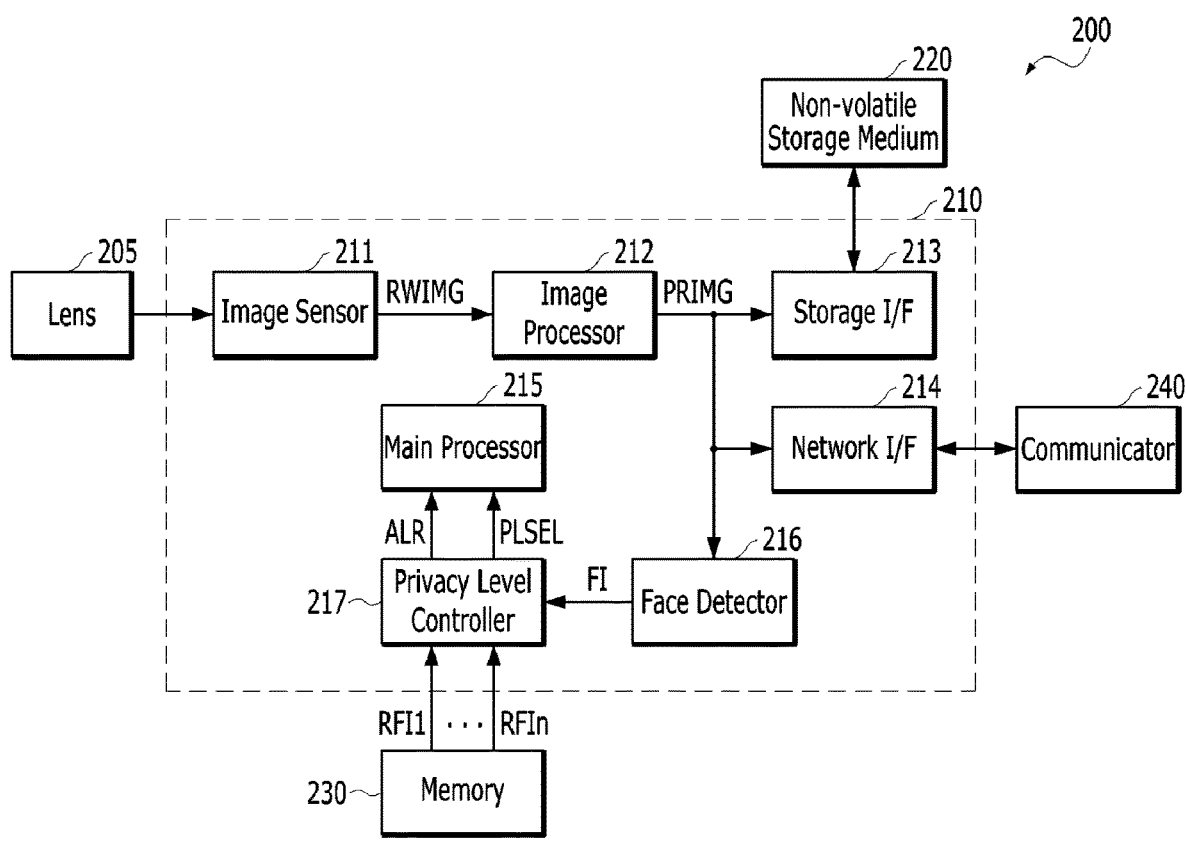
FIG. 2 is a block diagram of an exemplary embodiment of a video capturing system constructed according to the principles of the invention.

FIG. 2 is a block diagram of an exemplary embodiment of a video capturing system constructed according to the principles of the invention.

Referring to FIG. 2, the video capturing system 200 such as the camera 110 of FIG. 1 includes a lens 205, a video processing device 210, a nonvolatile storage medium 220 and a memory 230.

The video processing device 210 may capture a video, process the captured video, and perform various operations associated with the processed video. That is, the video processing device 210 is configured to perform operations of capturing the video and operations associated with the captured video.

The video processing device 210 may operate in a privacy mode. Fro example, the video processing device 210 may sense an image of a face ("face image") from the captured video, and enter the privacy mode based on the sensed face image. During the privacy mode, the video processing device 210 may stop the video capturing operation performed during a normal mode and at least some of the operations associated with the capture video. During the privacy mode, the video processing device 210 may perform an additional operation associated with the capture video, for example, video distortion.

The video processing device 210 can provide a plurality of privacy levels during the privacy mode. The video processing device 210 may select any one of the plurality of privacy levels based on the sensed face image. The video capturing operation and the operations associated with the captured video are selectively stopped and/or controlled according to the selected privacy level.

The video processing device 210 may include an image sensor 211, an image processor 212, a storage interface (I/F) 213, a network I/F 214, a main processor 215, a face detector 216 and a privacy level controller 217.

The image sensor 211 is connected to the lens 205. The image sensor 211 may operate in response to a control signal of the main processor 215. The image sensor 211 is configured to convert an optical signal received through the lens 205 into an electrical signal, and generate a raw image RWIMG by digitalizing the electrical signal. For example, the image sensor 21 may include an analog-digital converter.

The image processor 212 is connected to the image sensor 211. The image processor 212 may operate in response to a control signal of the main processor 215. The image processor 212 is configured to receive and process the raw image RWIMG to generate a processed image PRIMG. For example, the image processor 212 may adjust the size of the raw image RWIMG, adjust the resolution of the raw image RWIMG, or perform various algorithms for other necessary processes.

The storage I/F 213 interfaces the nonvolatile storage medium 220 and the video processing device 210. The storage I/F module 213 may operate in response to a control signal of the main processor 215. The storage I/F 213 module may receive the processed image PRIMG, and write the processed image PRIMG to the nonvolatile storage medium 220.

The network I/F 214 module interfaces between a communicator 240 (or transceiver) and the video processing device 210. The network I/F 214 module may operate in response to a control signal of the main processor 215. The network I/F 214 module may receive the processed image PRIMG and control the communicator 240 to transmit the processed image PRIMG to an external device such as the cloud database 130 and/or the user terminal 140 of FIG. 1 through the network 105 of FIG. 1. The communicator 240 may transmit and receive signals between the video capturing system 200 and other devices through the network 105.

The main processor 215 controls overall operations of the video capturing system 200. The main processor 215 may control the image sensor 211, the image processor 212, the storage I/F 213, the network I/F 214, the face detector 216 and the privacy level controller 217. In some exemplary embodiments, the main processor 215 may control overall operations of the video capturing system 200 by executing software and/or firmware. Such software and/or firmware may be loaded to an internal memory of the main processor 215 and/or an external memory, such as the memory 230, from the non-volatile storage medium 220, and may executed by the main processor 215.

The main processor 215 controls transitions between the normal mode and the privacy mode of the video processing device 210. Furthermore, the main processor 215 may control operations of capturing the video and operations associated with the captured video, such that the operations can be selectively performed according to the selected privacy level. The video capturing operation may be performed by the image sensor 211 and the main processor 215, and the operations associated with the captured video may be performed by the image processor 212, the storage I/F 213, the network I/F 214 and the main processor 215.

The face detector 216 is connected to the image processor 212. The face detector 216 may operate in response to a control signal of the main processor 215. The face detector 216 receives the processed image PRIMG provided by the image processor 212. The face detector 216 is configured to sense a face included in the processed image PRIMG, and provide face image information set FI according to the sensing result. The face detector 216 may detect an area including the face image in the processed image PRIMG to acquire and/or store the detected face image, and provide feature information of the detected face image, for example, feature points as the face image information set FI.

The privacy level controller 217 is connected to the face detector 216. The privacy level controller 217 may operate in response to a control signal of the main processor 215. The privacy level controller 217 receives the face image information set FI from the face detector 216, and receives first to n-th reference image information sets RFI1 to RFIn from the memory 230, where n is an integer larger than or equal to 2. The first to n-th reference image information sets RFI1 to RFIn stored in the memory 230 may correspond to first to n-th reference images, respectively. For example, the first to n-th reference images may be provided by a user selection, and the first to n-th reference image information sets RFI1 to RFIn may be acquired from the first to n-th reference images. Each of the first to n-th reference image information sets RFI1 to RFIn may include feature information of the corresponding reference image. The first to n-th reference image information sets RFI1 to RFIn may be generated by the face detector 216 and stored in the memory 230.

A storage medium such as the memory 230 may be implemented in the form of a memory device or system which is known or developed in this field, and configured to store the first to n-th reference image information sets RFI1 to RFIn. The memory 230 may further store privacy levels associated with the first to n-th reference image information sets RFI1 to RFIn, respectively. For example, the memory 230 may store privacy level information indicating which privacy level corresponds to each of the first to n-th reference image information sets RFI1 to RFIn. The first to n-th reference image information sets RFI1 to RFIn and the privacy levels may be stored in the nonvolatile storage medium 220, and loaded to the memory 230 by the main processor 215. The first to n-th reference image information sets RFI1 to RFIn and the privacy levels, which are loaded in the memory 230, may be provided to the privacy level controller 217.

The privacy level controller 217 is configured to compare the face image information set FI to the first to n-th reference image information sets RFI1 to RFIn, and report the comparison result to the main processor 215. The privacy level controller 217 may enable an alarm signal ALR when a reference image information set matches the face image information set FI is present in the first to n-th reference image information sets RFI1 to RFIn. The privacy level controller 217 may disable the alarm signal ALR when there is no reference image information set matched with the face image information set FI. The main processor 215 may generate event information in response to the disabled alarm signal ALR, and transmit the generated event information to the event management server 120 through the network I/F 214. For example, when a stranger is captured, a reference image information set matched with the face image information set FI may not be present. In this case, event information may be generated.

The privacy level controller 217 may select one of the privacy levels according to the reference image information set matched with the face image information set FI, among the first to n-th reference image information sets RFI1 to RFIn, and may report the selected privacy level PLSEL to the main processor 215. The privacy level controller 217 selects a privacy level corresponding to the matched reference image information set.

In some exemplary embodiments, the privacy level corresponding to each of the reference image information sets may be decided by a user input when the corresponding reference image is registered. For example, a privacy level corresponding to a first user may be the highest level, a privacy level corresponding to a second user may be the lowest level, and a privacy level corresponding to a third user may be the middle level therebetween.

The main processor 215 may control the video processing device 210 or the video capturing system 200 according to the selected privacy level. The operations performed by the video processing device 210 or the video capturing system 200 may be changed according to the selected privacy level.

For example, when the first privacy level is selected, the main processor 215 may control the image sensor 211 to stop capturing a video. When the video capturing is stopped, video streaming and video recording may not be performed. For example, all of the video capturing functions provided by the video capturing system 200 may be stopped. The main processor 215 may control the components of the video capturing system 200 to visually inform the user that the video capturing is not performed. For example, in the case of the video capturing system 200 which supports a function of moving the lens 205, such as a pan tilt camera, the main processor 215 may control the lens 205 to face a different direction, when the first privacy level is selected. Thus, the user may visually recognize that the video capturing is not performed. Furthermore, in the case of the video capturing system 200 which includes a light emitting device indicating that video capturing is being performed, the main processor 215 may control the light emitting device to stop emitting light or emit a different color of light, when the first privacy level is selected. Thus, the user may visually recognize that video capturing is not performed. In addition, a variety of event types may be defined, the event types including motion sensing, voice sensing, face sensing, body sensing, fire sensing, crying sound sensing, gunfire sound sensing, shock sound sensing and the like. When at least one of the event types is sensed from the captured video, the main processor 215 may generate event information, and store the generated event information in the event management server 120 through the network I/F 214. When the first privacy level is selected, the operations for generating the event information may also be stopped.

When the second privacy level is selected, the main processor 215 may capture a video, but stop the operation of transferring the captured video to an external device such as the cloud database 130 of FIG. 1 through the network I/F 214. In some exemplary embodiments, for the sake of security, the main processor 215 may sense an event, and store the corresponding video in the nonvolatile storage medium 220 through the storage I/F 213 when the event is sensed. At this time, the main processor 215 may not report the occurrence of the event to the user terminal 140 of FIG. 1.

When the third privacy level is selected, the main processor 215 may capture a video, but stop the operation of storing the captured video in any device. For example, the main processor 215 may stop the operation of storing the captured video in the nonvolatile storage medium 220 and the operation of storing the captured video in an external device through the network I/F 214. In the case where the operation of storing the captured video is performed in response to the event, the operation of sensing the event may also be stopped. At this time, the main processor 215 may provide the captured video to the external device in a streaming manner.

However, exemplary embodiments of operations for each privacy level are not limited to the above-described examples. In an implementation of the video processing device 210 or the video capturing system 200, the operations performed by the video processing device 210 or the video capturing system 200 may be modified in various manners, and therefore the operations controlled at the respective privacy levels may also be changed.

As such, the video processing device 210 may operate in the privacy mode based on a sensed face image. Compared to the case in which the entry to the privacy mode is controlled by a user input, the video processing device 210 may automatically operate in the privacy mode when a face image matches a reference face image, thereby improving video capturing system and/or network resources, performance and convenience.

Also, the video processing device 210 may selectively control the operations of capturing the video and the operations associated with captured videos, according to the selected privacy level. When registering a desired reference image, a user may select a privacy level corresponding to the desired reference image, and the operations of the video processing device 210 may be controlled according to which privacy level is selected. Since the variety of privacy levels that cause the video processing device 210 to control the operations may improve the user convenience, better allocate the use, availability and speed of network resources and may solve various issues associated with the video adaptively for each user. For example, the various technical issues that may be solved include the possibility that the captured video will be leaked, the finitude of the storage space for storing captured videos, and an excessive amount of event information accumulated in the event management server 120.

In FIG. 2, the face detector 216 and the privacy level controller 217 are illustrated as being distinguished from the main processor 215. However, exemplary embodiments are not limited thereto. The face detector 216 and the privacy level controller 217 may be integrated into the main processor 215, and the main processor 215 may perform the functions of the face detector 216 and the privacy level controller 217.

The face detector 216 and the privacy level controller 217 may be implemented through software, hardware, firmware or combinations thereof. For example, when the face detector 216 and the privacy level controller 217 may be implemented by software modules that provide the functions of the face detector 216 and the privacy level controller 217, the main processor 215 may provide the functions of the face detector 216 and the privacy level controller 217 by loading the corresponding software modules to a working memory such as the memory 230 and executing the loaded software modules.

Figure 3:
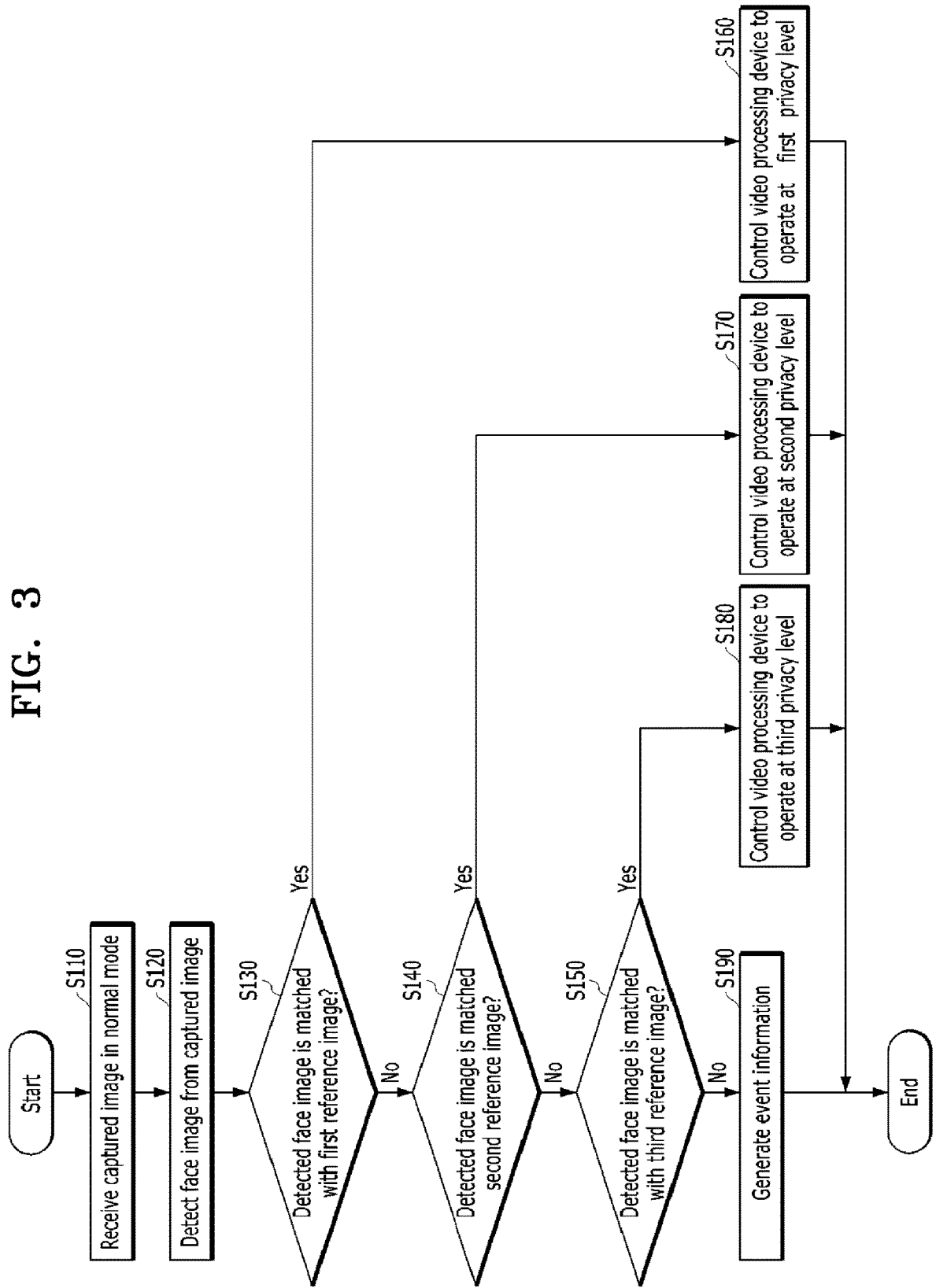
FIG. 3 is a flowchart of an exemplary embodiment of a method of providing a privacy mode based on a captured image according to the principles of the invention.

FIG. 3 is a flowchart of an exemplary embodiment of a method of providing a privacy mode based on a captured image according to the principles of the invention.

Referring to FIG. 3, an image captured in the normal mode is received in step S110. In step S120, a face image is detected from the captured image. The captured image may be processed according to predetermined methods, and an area including the face image in the processed image may be detected. The face image may be sensed through at least one of various methods such as a Gabor filter, PCA (Principal Component Analysis), FDA (Fisher Discriminant Analysis), ICA (Independent Component Analysis), LBP (local Binary Feature) and SVM (Support Vector Machine).

In step S130, the video capturing system determines whether the detected face image is matched with a first reference image. In an exemplary embodiment, the video capturing system may determine whether feature information (for example, feature points) of the detected face image is matched with a reference image information set of the first reference image. When the feature information of the detected face image is matched with the reference image information set, step S160 is performed. Otherwise, step S140 is performed.

Similar to step S130, the detected face image may be compared to other reference images. In the description with reference to FIG. 3, the case in which three reference images are present will be exemplified, for convenience of description. In step S140, the video capturing system determines whether the detected face image is matched with a second reference image. When the detected face image is matched with the second reference image, step S170 is performed. Otherwise, step S150 is performed. In step S150, the video capturing system determines whether the detected face image is matched with a third reference image. When the detected face image is matched with the third reference image, step S180 is performed. Otherwise, step S190 is performed.

When the detected face image is matched with any one of the first to third reference images, the video processing device 210 of FIG. 2 operates in the privacy mode. According to which reference image is matched with the detected face image, the corresponding privacy level is selected.

In step S160, the video processing device 210 is controlled to operate at the first privacy level. In step S170, the video processing device 210 is controlled to operate at the second privacy level. In step S180, the video processing device 210 is controlled to operate at the third privacy level.

In step S190, event information may be generated when the detected face image is not matched with the first to third reference images. The generated event information may be transmitted to the event management server 120 of FIG. 1, and the user terminal 140 of FIG. 1 may access the event management server 120 to receive the event information.

Figure 4:
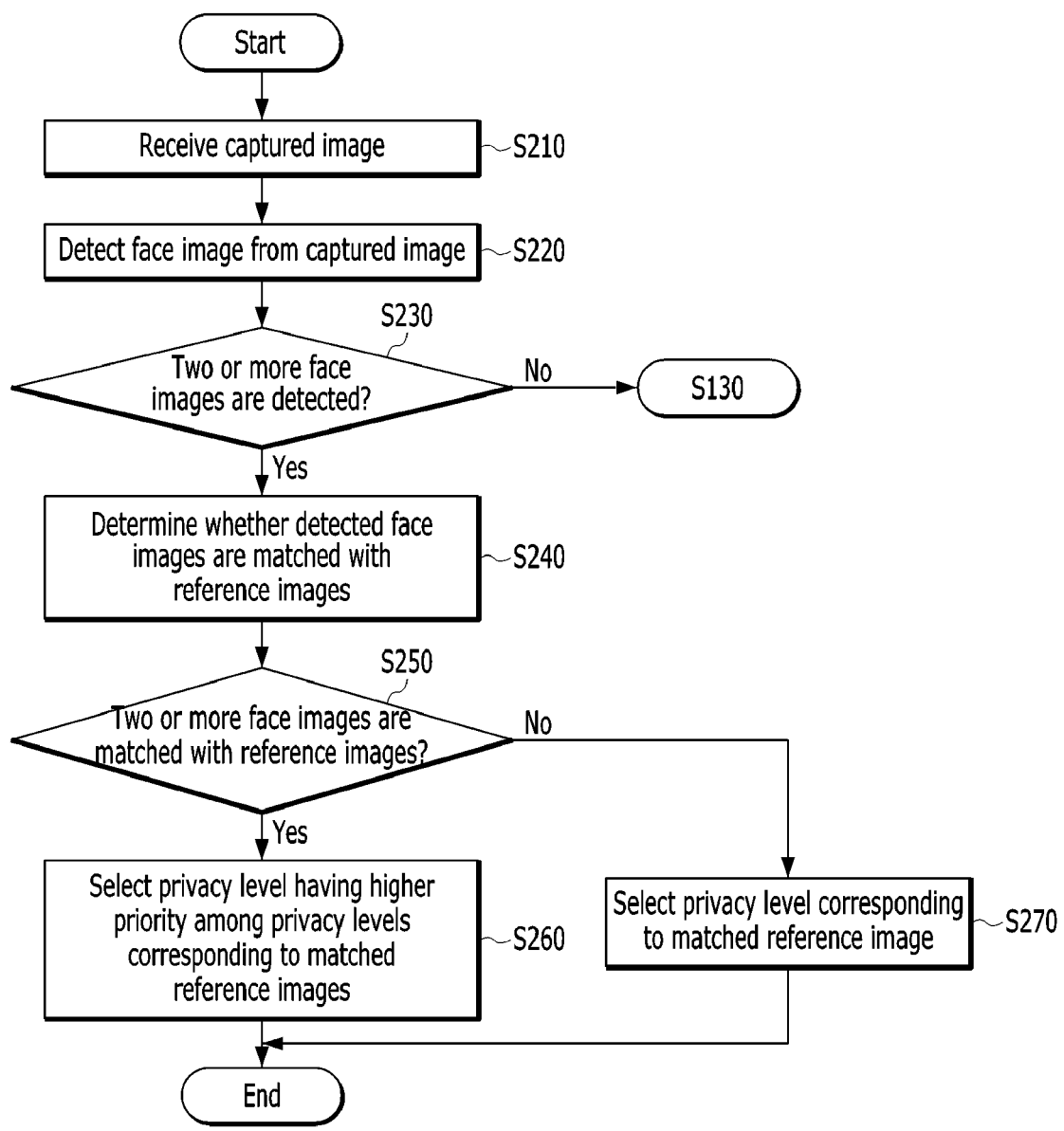
FIG. 4 is a flowchart of another exemplary embodiment of a method of providing the privacy mode based on the captured image.

FIG. 4 is a flowchart of another exemplary embodiment of a method of providing the privacy mode based on the captured image.

Referring to FIG. 4, a captured image is received in step S210. In step S220, a face image is detected from the captured image. Steps S210 and S220 may be performed in the same manner as steps S110 and S120 of FIG. 3. Thus, the duplicated descriptions are omitted for clarity and conciseness.

In step S230, the video capturing system determines whether two or more face images are detected from the captured image. When two or more face images are detected from the captured image, step S240 is performed. Otherwise, step S130 of FIG. 3 may be performed In step S240, the video capturing system determines whether each of the detected face images is matched with the reference images. Feature information may be extracted from each of the detected face images, and compared to the previously stored reference image information sets (see RFI1 to RFIn of FIG. 2).

In step S250, step S260 or S270 is performed according to whether the two or more face images are matched with the reference images.

In step S260, the privacy level having the highest priority is selected among privacy levels corresponding to the matched reference images. The priorities of the privacy levels may be decided in advance. For example, the first privacy level has the highest priority, the second privacy level has a lower priority than the first privacy level, and the third privacy level has a lower priority than the second privacy level.

In step S270, the privacy level corresponding to the matched reference image is selected.

Figure 5:
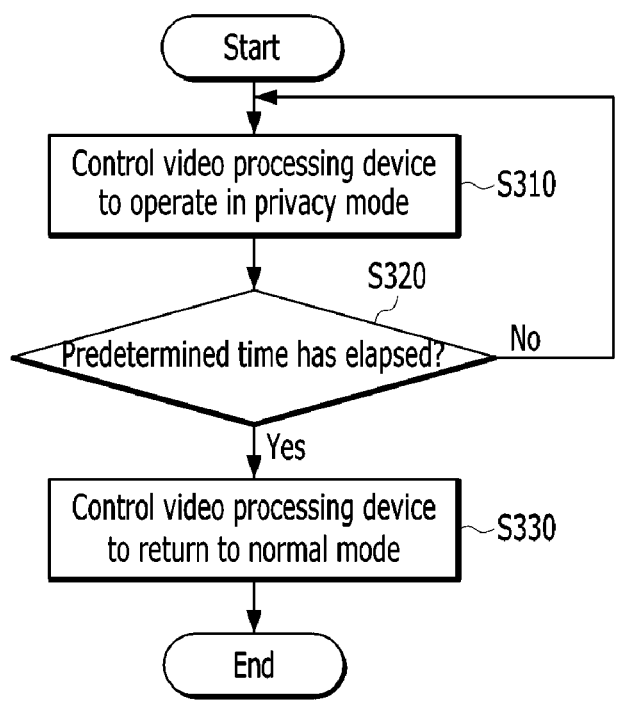
FIG. 5 is a flowchart of an exemplary embodiment of a method of returning from the privacy mode to a normal mode.

FIG. 5 is a flowchart of an exemplary embodiment of a method of returning from the privacy mode to a normal mode.

Referring to FIGS. 2 and 5, the video processing device 210 is controlled to operate in the privacy mode in step S310. The main processor 215 may control the video processing device 210 according to the selected privacy level.

In step S320, the video capturing system 200 determines whether a predetermined time has elapsed after the video processing device 210 started to operate in the privacy mode. For example, the video capturing system 200 may further include a timer, and determine whether a predetermined time has elapsed using the timer.

In step S330, the video processing device 210 is controlled to return to the normal mode. That is, the privacy mode is ended. For example, the video processing device 210 may operate at the selected privacy level for 30 minutes or one hour, and then return to the normal mode.

Figure 6:
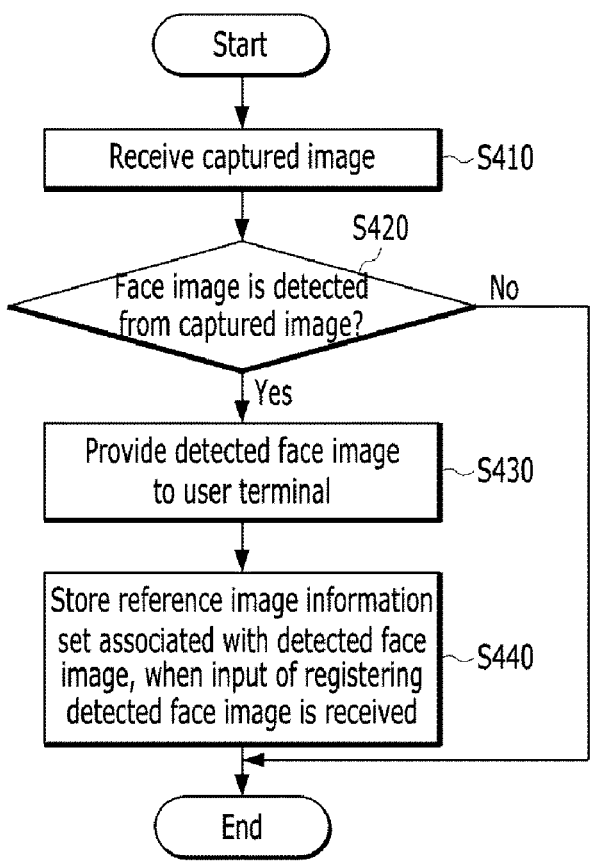
FIG. 6 is a flowchart of an exemplary embodiment of a method of providing reference image information sets.

FIG. 6 is a flowchart of an exemplary embodiment of a method of providing reference image information sets.

Referring to FIGS. 2 and 6, a captured image is received in step S410. According to whether a face image is detected from the captured image in step S420, step S430 is performed. Step S420 may be performed by the video capturing system 200. In this case, the detecting of the face image may be performed by the face detector 216 of FIG. 2.

In another embodiment, step S420 may be performed by the user terminal 140 of FIG. 1. In this case, the user terminal 140 may receive the captured image from the video capturing system 200 and may further include a software or hardware module for detecting a face image from the received image.

In step S430, the detected face image may be provided to the user terminal 140. The main processor 215 may transmit the detected face image to the user terminal 140 through the network I/F 214, and the user terminal 140 may display the received face image.

The user of the user terminal 140 may provide an input of registering (or selecting) the detected face image. At this time, the user may further provide an input of deciding a privacy level corresponding to the detected face image.

In step S440, feature information associated with the detected face image is stored as a reference image information set when the input of registering the detected face image is received from the user terminal 140. The input of registering the detected face image may be received from the user terminal 140 through the communicator 240. The main processor 215 may generate feature information associated with the detected face image and store the generated feature information as a reference image information set in the nonvolatile storage medium 220, in response to the input of registering the detected face image. The input of registering the detected face image may further include data on the decided privacy level. The decided privacy level may be further stored in the nonvolatile storage medium 220 in association with the reference image information set.

Figure 7:
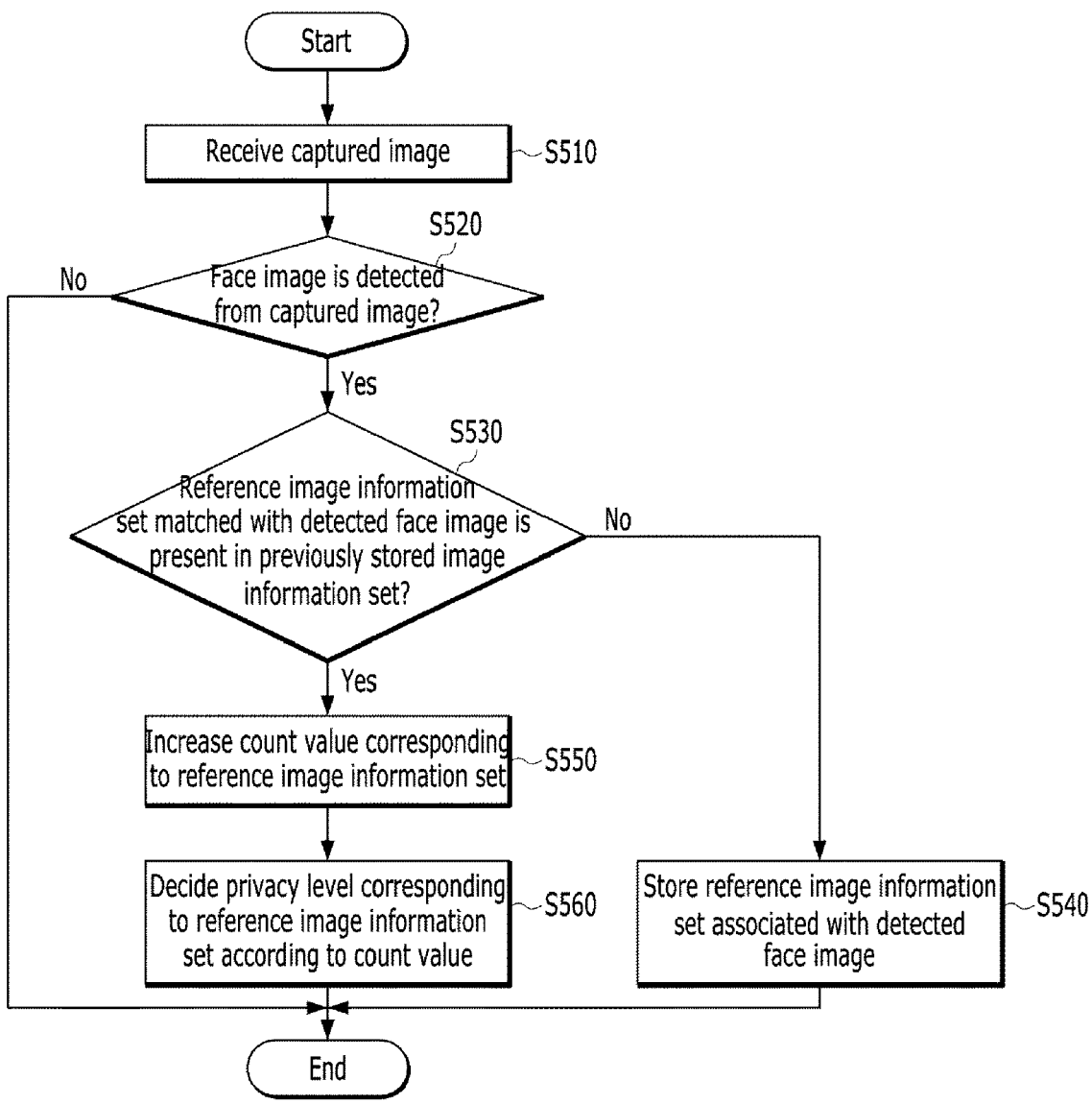
FIG. 7 is a flowchart of an exemplary embodiment of a method of determining a privacy level corresponding to each set of reference image information.

FIG. 7 is a flowchart of an exemplary embodiment of a method of determining a privacy level corresponding to each set of reference image information.

Referring to FIGS. 2 and 7, a captured image is received in step S510. According to whether a face image is detected from the captured image in step S520, step S530 is performed.

In step S530, the video capturing system determines whether a reference image information set matched with the detected face image is present in the previously stored reference image information sets (see RFI1 to RFIn of FIG. 2). Step S530 may be performed by the main processor 215, the face detector 216, and/or the privacy level controller 217. When the reference image information set matched with the detected face image is not present, step S540 is performed. Otherwise, step S550 is performed.

In step S540, the reference image information set associated with the detected face image is stored. The main processor 215 may generate feature information associated with the detected face image and store the generated feature information as a reference image information set in the nonvolatile storage medium 220.

In step S550, a count value corresponding to the reference image information set is increased. In step S560, a privacy level corresponding to the reference image information set is decided according to the count value. Steps S550 and S560 may be performed by the main processor 215.

Persons or objects which are frequently captured may be the main user of the space where the video capturing system 200 is installed, or users related to the main user. By managing the count value corresponding to each of the reference image information sets and deciding the privacy level according to the count value, the video capturing system 200 can estimate the main user or the users related to the main user, decide the privacy levels according to the appearance frequencies of the main user and the users, and apply the privacy levels when they are captured without user inputs such as selecting a reference image and setting the privacy level of the reference image. Therefore, it is possible to provide the video capturing system 200 capable of improving camera and network performance and convenience, and the operating method thereof.

FIG. 8 is a table showing an exemplary list of information associated with the reference image information sets.

Referring to FIGS. 2 and 8, a count value and a privacy level which correspond to a reference image information set may be decided through the embodiment of FIG. 7. The count value and the privacy level may be stored in the nonvolatile storage medium 220.

The first reference image information set RFI1 may have a first count value CNT1 and thus corresponds to a first privacy level PL1. The second reference image information set RFI2 may have a second count value CNT2 and a third privacy level PL3, and the n-th reference image information set RFIn may have an n-th count value CNTn and the second privacy level PL2. When the count value is greater than a first threshold value, the first privacy level PL1 may be stored in association with the corresponding reference image information set. When the count value is between the first threshold value and a second threshold value less than the first threshold value, the second privacy level PL2 may be stored in association with the corresponding reference image information set. When the count value is between the second threshold value and a third threshold value less than the second threshold value, the third privacy level PL3 may be stored in association with the corresponding reference image information set. As such, the privacy level corresponding to each of the first to n-th reference image information sets may be determined depending on the count value.

Table of FIG. 8 may further include a user designation field indicating whether the privacy level corresponding to each of the reference image information sets has been designated by a user. In FIG. 8, the user designation fields of the first, second and n-th reference image information sets RFI1, RFI2 and RFIn are stored as 'NONE' as the privacy levels thereof have been decided not by a user, but by the video capturing system 200 through the embodiments of FIG. 7.

Figure 9:
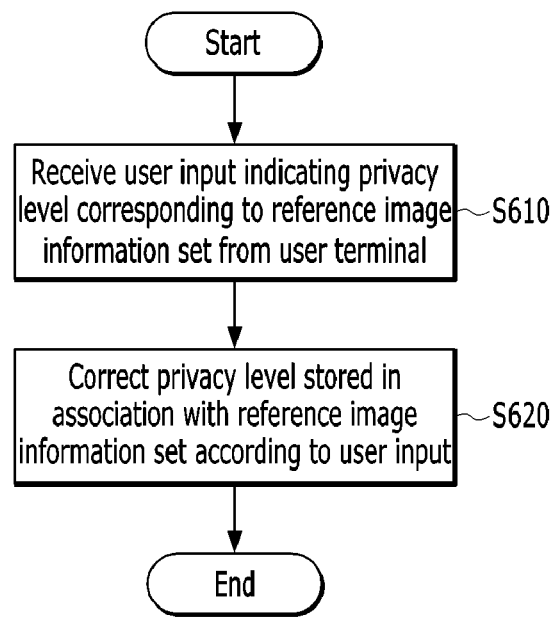
FIG. 9 is a flowchart of another exemplary embodiment of the method of determining a privacy level corresponding to each set of reference image information.

FIG. 9 is a flowchart of another exemplary embodiment of the method of determining a privacy level corresponding to each set of reference image information.

Referring to FIGS. 2 and 9, a user input indicating a privacy level corresponding to a reference image information set is received from the user terminal 140 of FIG. 1, in step S610. A user may access the video capturing system 200 to check a face image corresponding to each of the reference image information sets, and provide a user input of deciding the corresponding privacy level through the user terminal 140. For example, the user may check a face image corresponding to the second reference image information set RFI2 of FIG. 8, and set a privacy level corresponding to the face image to the first privacy level.

In step S620, the privacy level stored in association with the reference image information set is corrected according to a user input. For example, the main processor 215 may change the privacy level corresponding to the second reference image information set RFI2 from the third privacy level PL3 to the first privacy level PL1 according to the user input. At this time, the user designation field is changed from "NONE" to "YES", for example.

Figure 10:
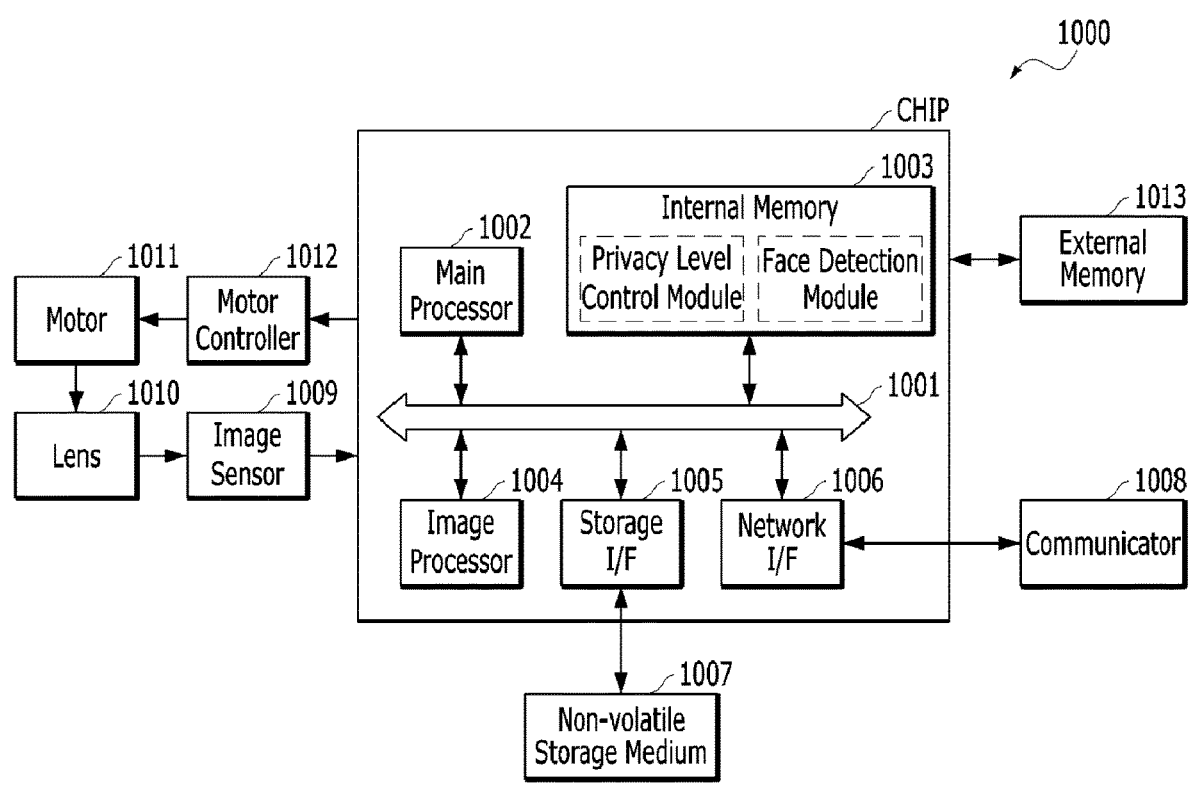
FIG. 10 is a block diagram of an exemplary embodiment of a computer system suitable for implementing the video capturing system of FIG. 2.

FIG. 10 is a block diagram of an exemplary embodiment of a computer system suitable for implementing the video capturing system of FIG. 2.

Referring to FIG. 10, the computer system 1000 may include a bus 1001, a main processor 1002, an internal memory 1003, an image processor 1004, a storage I/F 1005, a network I/F 1006, a nonvolatile storage medium 1007, a communicator 1008, an image sensor 1009, a lens 1010, a motor 1011, a motor controller 1012 and an external memory 1013.

The bus 1001 connects the components of the computer system 1000 for communication of data, signals and information. The main processor 1002 may be at least one of a general purpose processor and a dedicated processor, and control overall operations of the computer system 1000. The main processor 1002 may perform the functions of the main processor 215 described with reference to FIG. 2.

The functions of the face detector 216 and the privacy level controller 217 described with reference to FIG. 2 may be performed by the main processor 1002. In this case, the main processor 1002 may load a face detection module and a privacy level control module to the internal memory 1003, and execute the loaded modules to perform the functions of the face detector 216 and the privacy level controller 217. The face detection module may include a software module that provides the function of the face detector 2016 when executed by the main processor 1002, and the privacy level control module may include a software module that provides the function of the privacy level controller 217 when executed by the main processor 1002.

The internal memory 1003 may store computer programs and/or commands which are to be executed by the main processor 1002. For example, the internal memory 1003 is provided as a working memory of the main processor 1002. The internal memory 1003 may include a RAM (Random Access Memory), a ROM (Read Only Memory) or one or more combinations of various types of computer readable media.

The internal memory 1003 may further perform the function of the memory 230 described with reference to FIG. 2.

The image processor 1004, the storage I/F 1005, the network I/F 1006, the nonvolatile storage medium 1007 and the communicator 1008 are configured in the same manner as the image processor 212, the storage I/F 213, the network I/F 214, the nonvolatile storage medium 220 and the communicator 240 described with reference to FIG. 2.

The image sensor 1009 and the lens 1010 are configured in the same manner as the image sensor 211 and the lens 205 described with reference to FIG. 2. The motor 1011 is configured to drive the lens 1010, and the motor controller 1012 is configured to control the operation of the motor 1011 in response to a control signal of a semiconductor chip CHIP.

In some exemplary embodiments, the main processor 1002, the internal memory 1003 and the image processor 1004 may be integrated into one semiconductor chip CHIP. The semiconductor chip CHIP may further include the storage I/F 1005 and the network I/F 1006.

The computer system 1000 may further include an external memory 1013. The external memory 1013 may provide an additional storage space to the components within the computer system 1000, such as the main processor 1002. The external memory 1013 may be attached to and detected from the computer system 1000. For example, the processor 1002 may use the external memory 1013 as a working memory with the internal memory 1003.

Figure 11:
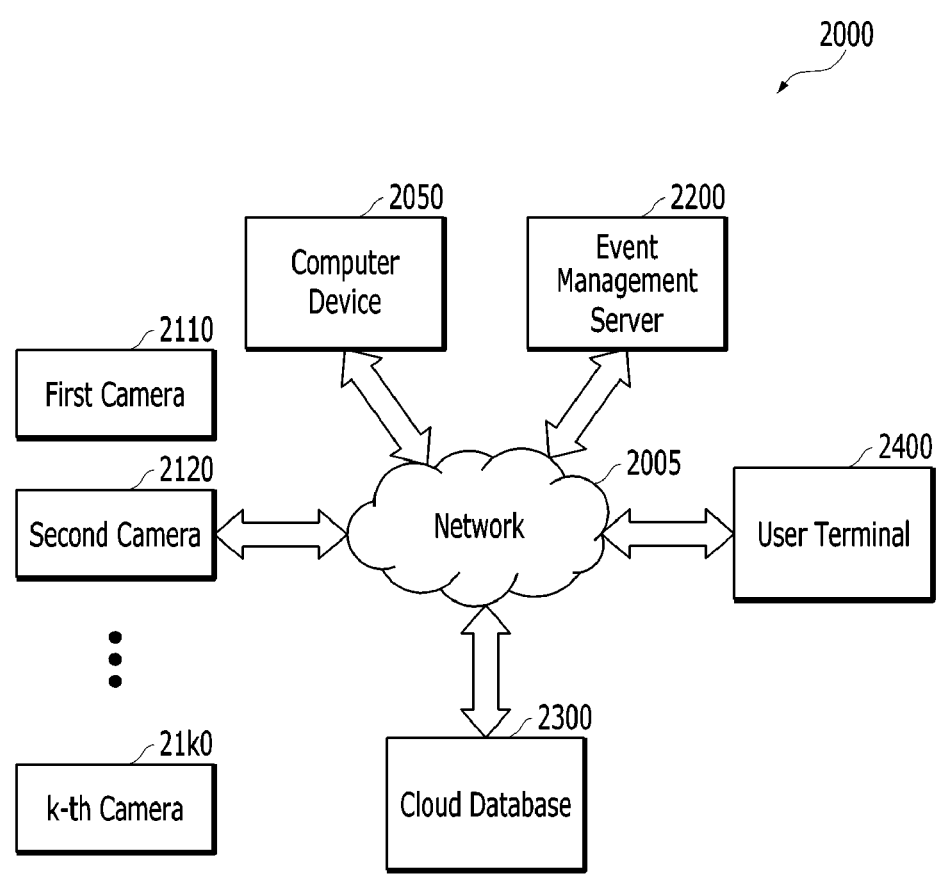
FIG. 11 is a block diagram of an exemplary embodiment of a network system including a plurality of cameras constructed according to the principles of the invention.

FIG. 11 is a block diagram of an exemplary embodiment of a network system including a plurality of cameras constructed according to the principles of the invention.

Referring to FIG. 11, the network system 2000 may include a network 2005, first to k-th cameras 2110 to 21$k$0, a computer device 2050, an event management server 2200, a cloud database 2300 and a user terminal 2400. The event management server 2200, the cloud database 2300, and the user terminal 2400 are configured in the same manner as the event management server 120, the cloud database 130 and the user terminal 140 of FIG. 1. Hereafter, the duplicated descriptions are omitted for clarity and conciseness.

A plurality of cameras such as the first to k-th cameras 2110 to 21$k$0 may be installed in specific areas such as the inside of a building, the outside of a building and a park. Furthermore, the computer device 2050 communicating with the first to k-th cameras 2110 to 21$k$0 may be provided. The computer device 2050 may control the first to k-th cameras 2110 to 21$k$0. In some exemplary embodiments, the computer device 2050 may include and execute dedicated software for controlling the first to k-th cameras 2110 to 21$k$0. In some exemplary embodiments, the computer device 2050 may be installed at a position adjacent to the first to k-th cameras 2110 to 21$k$0. In some embodiments, the computer device 2050 may include at least one of wired and wireless communication functions to communicate with the first to k-th cameras 2110 to 21$k$0 through the network 2005.

At least one of the first to k-th cameras 2110 to 21$k$0 may be the video capturing system 200 of FIG. 2, and thus perform the operations of the video capturing system 200 described with reference to FIGS. 3 to 9. Hereinafter, the first camera 2110 of the first to k-th cameras 2110 to 21$k$0 will be assumed to function as the video capturing system 200 of FIG. 2, for convenience of description.

Figure 12:
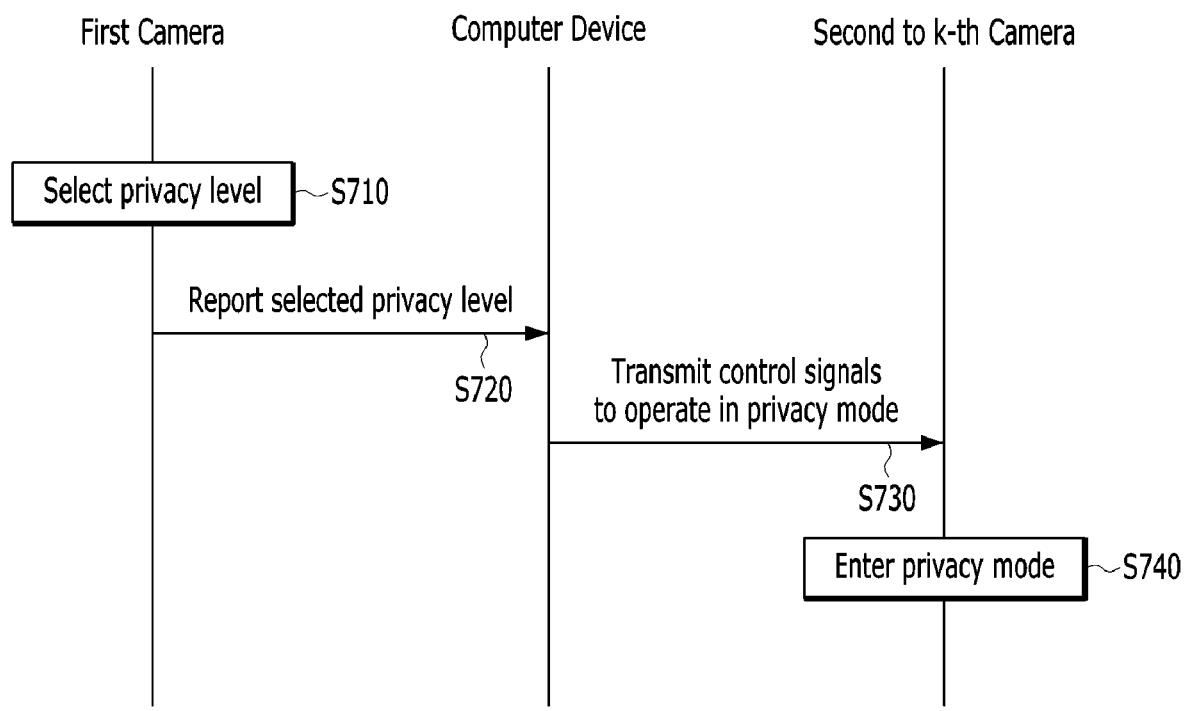
FIG. 12 is a flowchart of an exemplary embodiment of a method of providing a privacy mode for the plurality of cameras of FIG. 11.

FIG. 12 is a flowchart of an exemplary embodiment of a method of providing a privacy mode for the plurality of cameras of FIG. 11.

Referring to FIGS. 11 and 12, the first camera 2110 selects a privacy level in step S710. The first camera 2110 may control a video capturing operation and operations associated with a captured video, according to the selected privacy level.

In step S720, the first camera 2110 reports the selected privacy level to the computer device 2050.

In step S730, the computer device 2050 transmits control signals to operate the second to k-th cameras 2120 to 21$k$0 in the privacy mode, in response to the reception of the selected privacy level. For example, the computer device 2050 may report the selected privacy level to the second to k-th cameras 2120 to 21$k$0.

In step S740, the second to k-th cameras 2120 to 21$k$0 enter the privacy mode. The second to k-th cameras 2120 to 21$k$0 each may operate in the privacy mode, and may control the video capturing operation and the operations associated with the captured video in the same manner as the first camera 2110 according to the selected privacy level received through the computer device 2050.

Therefore, a camera of the first to k-th cameras 2110 to 21$k$0 including resources required for selecting one of a plurality of privacy levels may enable the other cameras to operate in the privacy mode even though the other cameras do not include such resources. For example, although the first camera 2110 includes a processor having relatively high performance and a memory having a relatively large storage space and each of the second to k-th cameras 2120 to 21$k$0 includes a processor having lower performance and a memory having a smaller storage space than the first camera 2110, the second to k-th cameras 2120 to 21$k$0 may enter the privacy mode depending on entry into the privacy mode at the first camera 2110, and may operate under the common privacy level selected by the first camera 2110.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A camera comprising:
a storage medium to store a plurality of image information sets each one of which is acquired from each one of a plurality of corresponding reference images in the camera, respectively;
a lens (205);
a communicator to provide communication with an external device; and
a video processing device to selectively control video capture and operations associated with video capture according to a selected privacy level in a privacy mode,
wherein the video processing device includes a face detector to sense a face image from the captured video from the lens (205),
wherein the image information set produced by the face image from the captured video matches one of the plurality of information sets, and a privacy level controller selects one of a plurality of privacy levels according to the image information set matched with the face image,
wherein the video processing device captures the video from the lens (205), and as a first privacy level of the plurality of privacy levels is selected by the privacy level controller, changes the capturing the video from the lens (205) to stop capturing the video from the lens (205),
wherein the video processing device transmits the captured video from the lens (205) to the external device through the communicator, and as a second privacy level is selected, changes the transmitting the captured video from the lens (205) to stop transmitting the captured video from the lens (205) to the external device while continuously performing the capturing of the video from the lens (205),
wherein the face detector is operable to acquire face images, to generate the plurality of image information sets in association with the acquired face images, and to generate signals to store the plurality of image information sets in the storage medium, and
wherein the video processing device is operable to set privacy levels corresponding to the plurality of image information sets by determining a privacy level corresponding to each of the image information sets according to the number of face images associated with the corresponding image information set from among the acquired face images, and to generate signals to store the set privacy levels in the storage medium.

2. The video capturing system of claim 1, further comprising an external terminal to receive a user input indicating a privacy level corresponding to a selected image information set from among the plurality of image information sets, and wherein the video processing device is operable to correct the privacy level stored in association with the selected image information set in response to the user input.

3. The video capturing system of claim 1, wherein the sensed face image comprises a first face image and a second face image,
the first and second face images are matched with first and second image information sets of the plurality of image information sets, respectively,
the first and second image information sets correspond to the first and second privacy levels, respectively, and
the privacy level controller selects the privacy level having a higher priority between the first and second privacy levels, with the priorities of the first and second privacy levels being predetermined.

4. The video capturing system of claim 1, wherein the video processing device is operable to transmit event information to the external device through the communicator when each of the plurality of image information sets is not matched with the sensed face image.

5. The video capturing system of claim 1, wherein the video processing device is operable to stop the privacy mode a predetermined time period after starting to operate in the privacy mode.

6. The video capturing system of claim 1, wherein the video processing device is operable to activate or deactivate other parts of the operations when a third privacy level of the plurality of privacy levels is selected.

7. The video capturing system of claim 1, wherein the storage medium comprises a nonvolatile storage medium,
wherein the operations comprise at least one of a first operation of storing the captured video in the nonvolatile storage medium and a second operation of storing the captured video in an external storage medium through the communicator, and
the video capturing device is operable to stop the first and second operations when a third privacy level of the plurality of privacy levels is selected.

8. The video capturing system of claim 1, wherein the video processing device is operable to transfer the selected privacy level to the external device through the communicator.

9. The camera of claim 1, wherein the storage medium is configured to store each one of the plurality of privacy levels corresponding to each one of the plurality of image information sets, respectfully.

10. A network system comprising a plurality of cameras connected to the network,
wherein a first camera of the plurality of cameras comprises:
a lens (205);
a communicator to provide communication through the network;
a storage medium to store a plurality of image information sets corresponding to a plurality of reference images, respectively; and
a video processing device to selectively control capturing video and operations associated with the captured video according to a selected privacy level in a privacy mode,
wherein the video processing device includes a face detector to sense a face image from the captured video from the lens (205),
wherein the image information set produced by the face image from the captured video matches one of the plurality of information sets, and a privacy level controller selects one of a plurality of privacy levels according to the image information set matched with the face image,
wherein the video processing device captures the video from the lens (205), and as a first privacy level of the plurality of privacy levels is selected by the privacy level controller, changes the capturing the video from the lens (205) to stop capturing the video from the lens (205),
wherein the video processing device transmits the captured video from the lens (205) to an external device through the communicator, and as a second privacy level is selected, changes the transmitting the captured video from the lens (205) to stop transmitting the captured video from the lens (205) to the external device while continuously performing the capturing of the video from the lens (205), and
wherein a second camera of the plurality of cameras is operable to enter the privacy mode when one of the plurality of privacy levels for the first camera is selected,
wherein the face detector is operable to acquire face images, to generate the plurality of image information sets in association with the acquired face images, and to store the plurality of image information sets in the storage medium, and
wherein the video processing device is operable to set privacy levels corresponding respectively to the plurality of image information sets by determining a privacy level corresponding to each of the image information sets according to the number of face images associated with the corresponding image information set among the acquired face images, and to generate signals to store the set privacy levels in the storage medium.

11. The network system of claim 10, further comprising a computer device to communicate with the plurality of cameras through the network,
wherein the first camera is operable to transfer the selected privacy level to the computer device through the communicator, and
the computer device is operable to control the second camera to operate in the privacy mode according to the selected privacy level.

12. The network system of claim 11, wherein the computer device is operable to transfer the selected privacy level to the second camera, and
the second camera is operable to control capturing video and at least one operation associated with the video captured by the second camera according to the selected privacy level in the privacy mode.

13. The network system of claim 10, wherein the second camera is operable to selectively control capturing video and the operations associated with the video captured by the second camera in substantially the same manner as the first camera in the privacy mode.

14. The video capturing system of claim 10, further comprising an external terminal to receive a user input indicating a privacy level corresponding to a selected image information set from among the plurality of image information sets, and wherein the video processing device is operable to correct the privacy level stored in association with the selected image information set in response to the user input.

* * * * *